United States Patent [19]

McClellan

[11] 4,121,366
[45] Oct. 24, 1978

[54] FISHING LURE WITH INTERCHANGEABLE SPINNER AND HOOK CONNECTIONS

[75] Inventor: Bingham A. McClellan, Traverse City, Mich.

[73] Assignee: McClellan Industries, Inc., Traverse City, Mich.

[21] Appl. No.: 818,551

[22] Filed: Jul. 25, 1977

[51] Int. Cl.² .............................................. A01K 85/00
[52] U.S. Cl. .................................................. 43/42.09
[58] Field of Search .................... 43/42.09, 42, 42.04, 43/42.39

[56] References Cited

U.S. PATENT DOCUMENTS

| | | | |
|---|---|---|---|
| 2,295,292 | 9/1942 | Rogers | 43/42.09 |
| 2,940,204 | 6/1960 | Mehnert | 43/42.09 |
| 3,091,883 | 6/1963 | Hufford | 43/42.09 |

Primary Examiner—Harold D. Whitehead
Attorney, Agent, or Firm—Austin A. Webb

[57] ABSTRACT

A central support of piano wire has a straight center section with a return bend forming a hook receiving eye on its rear end with a locking spur projecting forwardly from the eye. The front end is twisted into a line receiving eye with a stirrup extending from the end of the twist in spaced relation to the center section and terminating in a hook releasably engaged with the center section. Slidably engaged on the wire are spacing elements including a spinner rotatable about the center section, and an elongated body having a longitudinal bore receiving the wire and a weight mass eccentric to the wire. The rear end of the mass defines a longitudinal slot opening radially from the bore and receiving the locking spur in non-rotary engagement when the body and the spacing elements are slid rearwardly on the center section and retained between the hook receiving eye and the hook on the stirrup.

13 Claims, 7 Drawing Figures

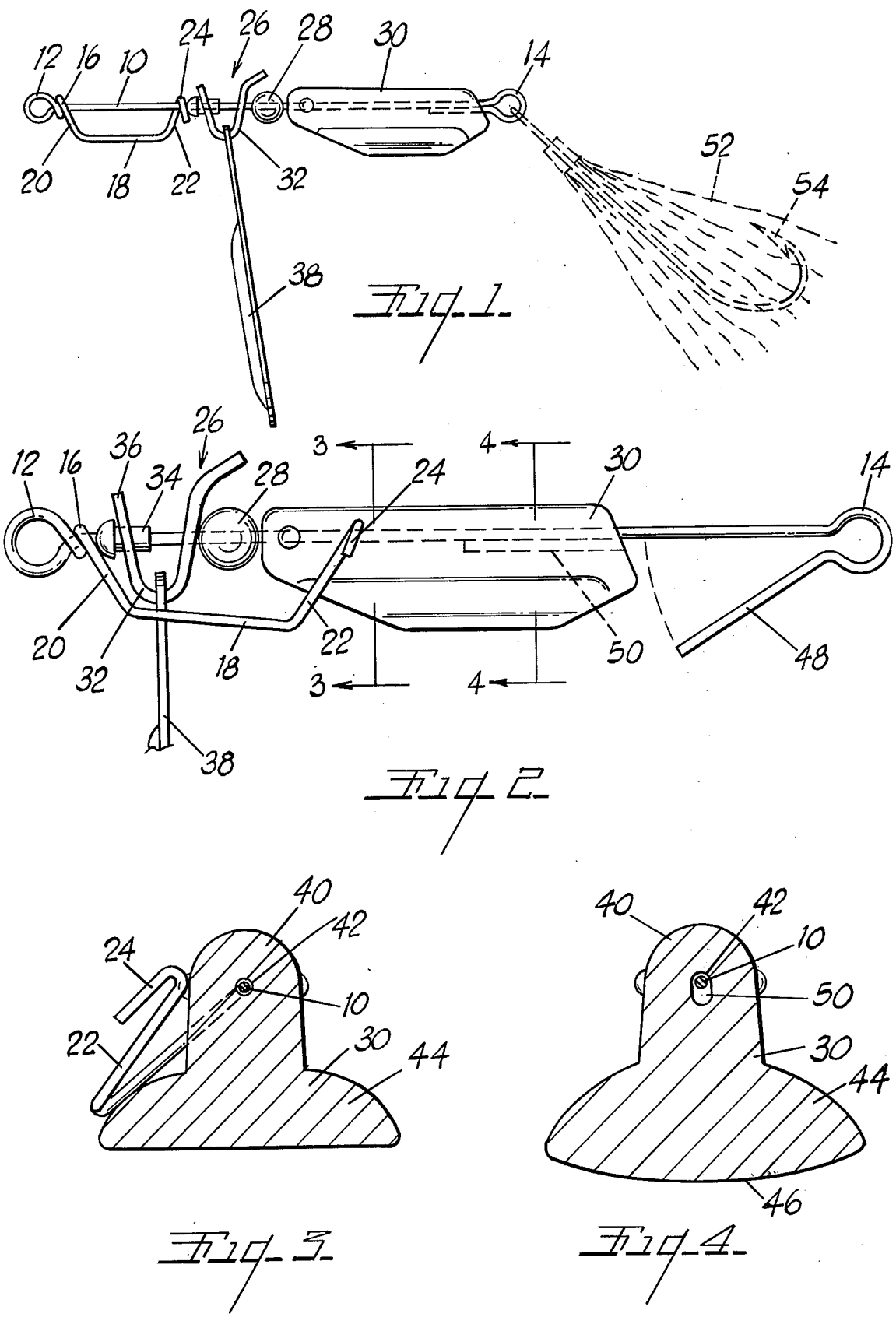

FISHING LURE WITH INTERCHANGEABLE SPINNER AND HOOK CONNECTIONS

OUTLINE OF INVENTION

The purposes of the invention are to provide a lure which includes a harness or connector which may be relatively permanently connected to a fishing line at one end and selectively or easily interchangeably connected to a hook or fly at the other end, while providing a weight and a spinner or spoon between the connections to the line and the hook in such a manner as to prevent the hook and weight from rotating and twisting the line when the lure is in use. To this end, a single continuous length of stiff wire, such as piano wire, is shaped or bent into permanent bends to provide a straight center section with permanently formed loops or eyes at each end. The loop forming the rear eye is springably openable and provided with a forwardly extending spur end that is nonrotatably engageable with the rear end of the sinker. The sinker is selectively slidably carried on the straight center section of the wire, and has an off-center mass and center of gravity relative to the axis of the center section of the wire. When the weight is slid forwardly on the center section of the wire the nonrotatable connection between the weight and the spur on the rear eye is released so that the rear eye may be opened for changing the hook or fly. The straight center section of the wire projects forwardly beyond the front end of the weight in the rearwardly located position of the weight. The length of this forward projection is sufficient to provide space for rotary support for the spinner or spoon plus space for forward displacement of the weight out of engagement with the spur on the rear eye. The end of the wire which forms the front eye is formed to provide a U-shaped stirrup which projects laterally from the straight center section, then rearwardly, and then reversely toward the center section where the terminal end of the wire is formed into a U-shaped hook engageable over the straight center section. The length of the stirrup, between the front eye and the U-shaped hook, is approximately equal to the length of the nonrotatable engagement between the rear end of the weight and the forwardly projecting spur on the rear eye. When the U-hook on the stirrup is engaged over the center section it blocks forward displacement of the spinner and the weight out of nonrotatable engagement with the spur.

As modifications of the preferred form of the lure, the front eye as well as the rear eye may be springably closed on the end of the straight center section, and the bends of the stirrup and the U-shaped hook may be made of sufficiently large radius to permit removal and inter-change of the spinner and a loop on the line.

Weights with off-center masses, spinners or spoons, bearing or decorating beads, and fish hooks with fly dressing are acknowledged to be old; but springably openable eyes, slidably disengageable nonrotary connection between a weight and a rear eye, and a front stirrup with a U-shaped hook for releasably engaging a straight center section of a harness wire in front of a slidable weight are believed to be novel.

DETAILED DESCRIPTION

The drawings, of which there are two sheets, illustrate a preferred form and one modified form of the lure of the invention.

FIG. 1 is a side elevational view of a preferred form of the lure of the invention.

FIG. 2 is an enlarged side elevational view of the harness portion of the lure in FIG. 1 in open position and with the hook or fly removed.

FIG. 3 is a transverse cross sectional view taken along the plane of line 3—3 in FIG. 2 and looking in the direction of the arrows.

FIG. 4 is a transverse cross sectional view taken along the plane of line 4—4 in FIG. 2 and looking in the direction of the arrows.

Figure 5:
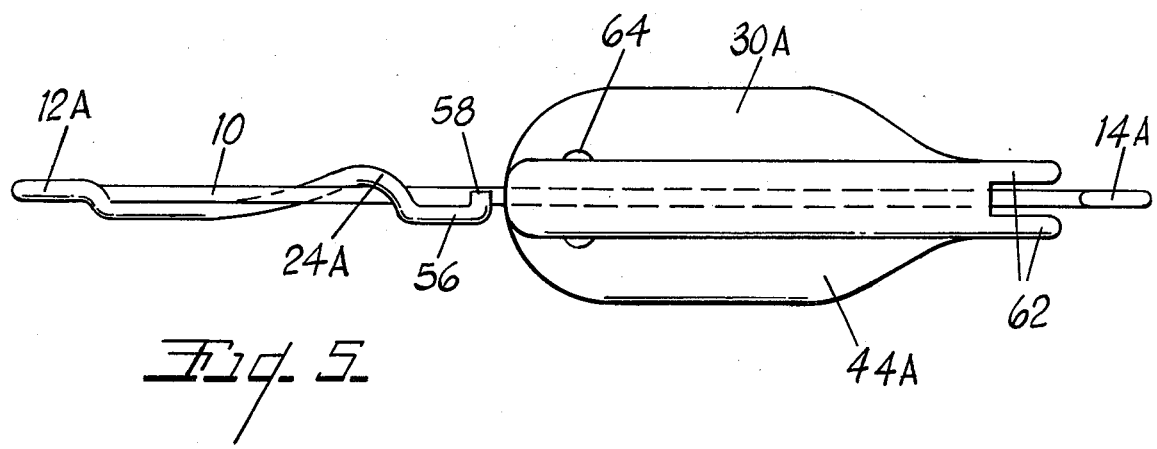
FIG. 5 is a top plan view of a modified form of the harness shown in FIGS. 1 to 4.

The lure or harness shown in FIGS. 1-4 is assembled on and includes a length of stiff wire such as piano wire capable of being bent or shaped into relatively fixed or permanent bends but flexible between and within those bends. The wire has a straight center section 10 with a first loop or eye 12 formed at its forward end and a second loop or eye 14 at its rear end. The eye 12 is made permanent as by a loop 16 bent tightly around the straight center section. A stirrup 18 with side arms 20 and 22 is formed in the wire at the end of the loop 16 and extends rearwardly from the loop in offset relation to the center section. An open U-shaped hook 24 is formed on the end of the rear arm 22 and is releasably engageable over the center section as shown in FIG. 1. The hook is biased into hooking engagement with the center section by pre-stressed tensions in the wire created by bending the loop 16 and stirrup 18, but is disengageable from the center section as shown in FIGS. 2 and 3, by flexing of the end of the loop 16 and the arms and body of the stirrup.

Assembled on the center section, desirably prior to complete formation of the rear eye 14, are a spinner or spoon indicated at 26, bearing bead 28 and a weight or body 30. The particular spoon illustrated has a rigid stirrup 32 with a ball headed sleeve 34 positioned rotatably on the center section and engaged in supporting engagement through the front arm of the stirrup 36. The rear arm of the stirrup passes freely over the center section of the wire and abuts at its rear side against the bead 28. The actual spoon 38 hangs freely from the bight of the stirrup 32.

The weight or body 30 has an elongated upper portion 40 of semi-cylindrical cross section defining a longitudinal bore 42 which rides on the center section 10 of the wire.

The lower portion of the body is laterally enlarged as at 44 and rounded on its lower side as at 46 to provide a weight mass eccentric to the center section 10 of the wire. The weight accordingly always remains upright as shown when towed through the water.

The rear eye 14 on the center section 10 of the wire is provided with a forwardly extending prong or spur 48. Desirably the eye 14 is given a permanent bend which does not completely close the eye but leaves the spur 48 angled relative to the center section of the wire but springably closable thereagainst. The rear end of the bore 42 in the upper part of the body is enlarged as shown in FIG. 4 to form a vertically extending slot 50, the lower portion of which slidably receives the spur 48 when the body 30 is in its rearwardly adjusted position as shown in FIG. 1. In this position, the entire wire including the eyes 12 and 14 is held against rotation relative to the weighted body; and since, as previously noted, the body will maintain an upright position when the body is towed through the water with a dressed hook or fly (indicated by the dotted lines at 52 in FIG. 1) attached to the rear eye 14, neither eye 12 or 14 will rotate, so a fishing line attached to the front eye 12 will not be twisted and the fly will remain in the position selected by the fisherman, either with the point 54 of the hook upwardly as shown or reversely downwardly. When the lure and the fly are towed slowly so that the fly tends to fall or drag at an angle relative to the body as shown, the shank of the hook acts as a guard or bumper to prevent the point 54 from snagging on underwater obstructions over which the lure may be drawn. At the same time, the position of the body 30 above the point 54 tends to prevent superimposed obstructions from snagging the hook. The rotating motion of the spoon 38 does not impart rotation to the lure or cause twisting of the line.

Should the fisherman desire to change the fly to one of a different color or with a different size of hook as is common, he has only to disengage the U-bend hook 24 from the straight center portion 10 of the wire and deflect the stirrup 18 to one side as shown in FIGS. 2 and 3 so that the yoke 32 of the spinner, the bearing ball 28 and the body 30 can be slid forwardly as in FIG. 2 to release the spur 48. The fly 52 is then easily removed and another fly attached to the eye 14. Reverse sliding motion of the body with the spur compressed to enter slot 50 locks the new fly in position. The spinner 26 and its bearing 28 are slid against the front of the body and held in that position by relocking or engaging the U-hook 24 over the straight center section of the wire.

Figure 6:
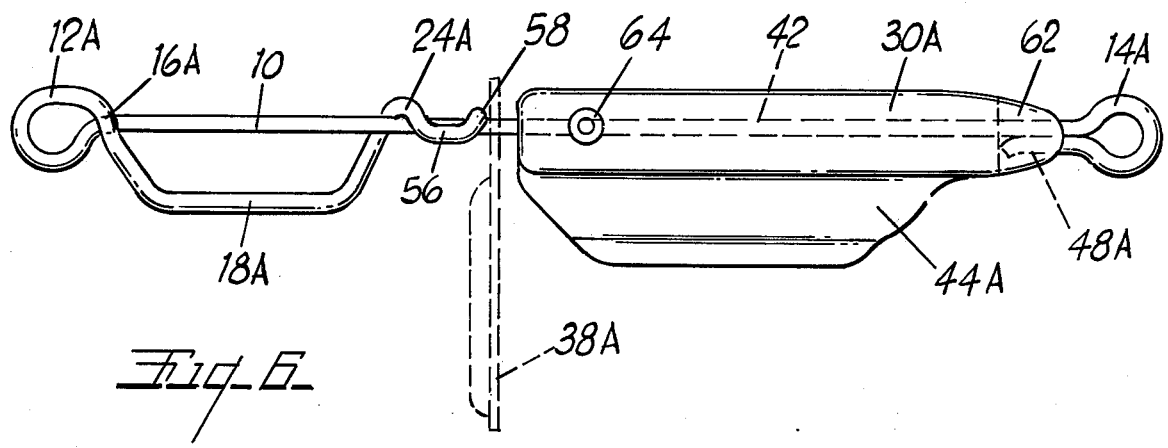
FIG. 6 is a side elevational view showing the harness in FIG. 5 in closed position.
Figure 7:
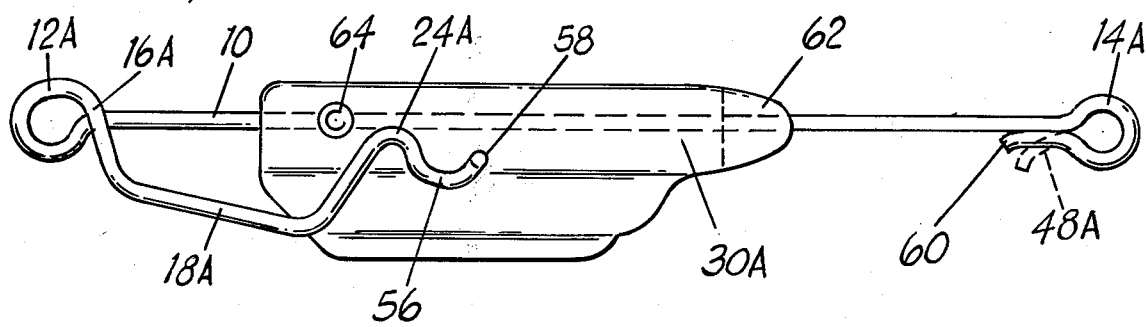
FIG. 7 is a side elevational view of the harness in FIG. 6 in open position.

FIGS. 5, 6 and 7 show a modified form of the lure which performs all of the functions of the preferred form. The same straight center section 10 is provided on the wire harness. The forward eye 12A is not permanently closed as a partial wrap 16 A replaces the full wrap 16 of the first form of the harness. The lower base 18A of the stirrup is angled under the straight center portion 10 and upwardly to a modified U-shaped hook 24A which hooks springably over the wire as before but which is provided with a rearwardly extending tongue 56 and a transversely curled terminal curve 58. The rear edge of the curve 58 functions as a stop and bearing surface in coaction with a spoon or spinner 38A mounted directly on the straight center portion 10. By making the curves of the partial wrap 16A, stirrup 18A, hook 24A and terminal curve 58 relatively wide, the spinner 38A may be removed, changed or omitted at the option of the fisherman.

At the same time, the modified weight body 30A and its eccentric lower enlargement 44A may be slid forwardly to release the modified spur 48A on the rear eye 14A. The eye 14A and spur 48A are tightly or overly curved and set so that the spur laps closely along side of the straight portion 10. A short lip or prong 60 on the forward end of the spur forms a cammed entry notch for easy insertion of the eye of a hook or dressed fly into the eye 14A by springing open the spur 48A as shown by the dotted lines in FIG. 7. To coact with the modified rear eye 14A and spur 48A, the modified body 30A omits the internal slot 50 of the preferred form of the lure at the rear end of the longitudinal bore 42. In place of a slot, the modified body 30A is provided with laterally spaced parallel ears 62 on its rear end to receive the forward end of the spur 48A and prevent rotation of the straight center portion 10 of the wire and eyes 12A and 14A relative to the body 30A, so the towing line is not twisted.

Both forms of the weighted body of the lure may be provided simulted features of a bait body such as eye simulating dimples 64.

Various changes in details and combinations of the features of the disclosed lure may be made without departing from the theory and spirit of the invention.

What is claimed to be new and what is desired to be secured by Letters Patent is defined in the following Claims:

1. A harness for releasably and selectively connecting fish hooks and fish attracting elements to a fishing line comprising:
    a relatively stiff wire having a straight center section with permanently curved front and rear eyes at its ends,
    an integral spur projecting forwardly from said rear eye and springably openable and closable to permit selective engagement of the eye of a fish hook with said rear eye,
    an integral stirrup projecting rearwardly from said front eye and having a hook at its rear end releasably engaged with said wire in rearwardly spaced relation from said front eye,
    and a rigid body having a longitudinal bore through its upper portion receiving said wire and being slidable between forward and rearward portions on said wire and having a weight mass eccentric to said wire,
    the rear end of said body having surfaces which laterally overlap said spur and prevent rotation of the body on said wire and prevent opening of said rear eye in the rearward position of said body,
    said hook on said stirrup blocking forward sliding motion of said body out of nonrotating and nonopening engagement with said spur when said hook is engaged with the center portion of said wire.

2. A harness for lures as defined in claim 1 in which the hook on said stirrup is spaced from the front end of said body when the body is in its rearmost position on the center section of said wire, said space being less than the longitudinal overlap of said spur with the laterally spaced surfaces at the rear of said body.

3. A harness for lures as defined in claim 2 in which there is a spinner element slidably and rotatably mounted on said wire in said space between said stirrup and said body.

4. A harness for lures as defined in claim 3 in which said front eye on said wire is permanently closed by a complete wrap of said wire about itself and at the front end of said stirrup.

5. A harness for lures as defined in claim 4 in which said laterally spaced surfaces on the rear of said body are defined by an enlargement in the rear end of the bore in the body, the enlargement being sized to receive a substantial length of said spur.

6. A harness for lures as defined in claim 5 in which said rear eye on said wire is incompletely closed in its free state and is closed under spring tension when said spur is received in the enlargement at the rear end of said bore in said body.

7. A harness for lures as defined in claim 3 in which there is a bearing bead located between said spinner element and said body and slidable and rotatable on said wire.

8. A harness for lures as defined in claim 6 in which there is a bearing bead located between said spinner element and said body and slidable and rotatable on said wire.

9. A harness for lures as defined in claim 2 in which said front eye on said wire is releasably and springably closed by a partial wrap of the wire between the eye and the front of said stirrup.

10. A harness for a fishing lure as defined in claim 9 in which the hook at the rear end of said stirrup consists of a partial wrap of the wire about the straight center section followed by a second partial wrap in opposed relation to the front of said body.

11. A harness as defined in claim 10 in which said second partial wrap is in the opposite direction to the partial wrap at the end of said front eye.

12. A harness for a fishing lure as defined in claim 2 in which the laterally spaced surfaces at the rear of said body are defined by the opposed surfaces of spaced ears projecting rearwardly from the rear of said body,
the rear eye on said wire being closed in unstressed condition.

13. A harness for a fishing lure as defined in claim 12 in which said spur extends forwardly from said rear eye in generally parallel closely lapped relation to the rear end of said straight center section.

* * * * *